L. C. BICKINGS.
Thrashing-Machines.

No. 139,857.  Patented June 17, 1873.

Witnesses.
Isaac R. Oakford
Thos ...

Inventor.
Lewis C Bickings

UNITED STATES PATENT OFFICE.

LEWIS C. BICKINGS, OF NORRISTOWN, PENNSYLVANIA.

IMPROVEMENT IN THRASHING-MACHINES.

Specification forming part of Letters Patent No. 139,857, dated June 17, 1873; application filed May 3, 1873.

*To all whom it may concern:*

Be it known that I, LEWIS C. BICKINGS, of Norristown, county of Montgomery, State of Pennsylvania, have invented a certain Improvement in Thrashing-Machines, of which the following is a specification:

The object of my invention is to construct the concave and the thrashing-cylinder in such a manner as to thrash out the grain without tangling or injuring the straw. It is more particularly adapted for use in thrashing out rye, in which it is desired to preserve the straw straight and even.

Figure 1:
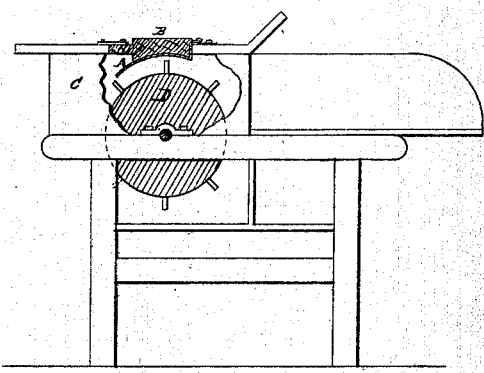
Figure 2:
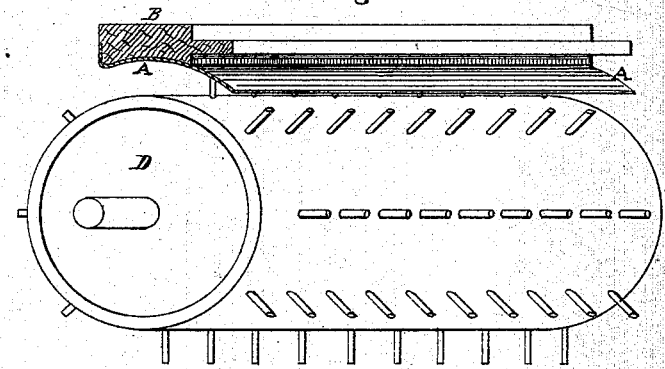

Figure 1 is a side elevation of a thrashing-table and cylinder, showing my invention applied. Fig. 2 is a perspective view (enlarged) of my invention detached from the table.

The concave A is made with a smooth surface of sheet iron, or any other flexible metal or material, and is secured to the under side of a cross-beam, B, which is hinged to the box or casing C directly over the thrashing-cylinder, as shown in Fig. 1. The thrashing-cylinder D, which is otherwise of the ordinary construction, is furnished with seventy-two teeth, arranged in parallel rows lengthwise with the cylinder, and in an oblique position around the periphery, as shown in Fig. 2, so that the entire surface of the concave is swept at one revolution of the cylinder.

A portion of the concave A is extended over so as to retain the grain down on the cylinder and prevent the cereal passing through too rapidly, thereby more effectually thrashing the grain from the stalks. The flexibility of the concave permits the projecting portion to be turned or bent downward to retain the grain in closer contact with the cylinder in case it is not thoroughly thrashed from the straw.

In thrashing rye the sheaf is divided into three or more parts, and each part is griped between the hands and passed straight and even into the cylinder with the grain foremost, and held until the straw has passed about one half way through, or until a sufficient gripe has been obtained to draw it through, and as the cylinder revolves the teeth strike the heads containing the grain. While the teeth, owing to their being secured in straight lines around the periphery, pass between the stalks without breaking or tangling them.

The straw passes from the cylinder to the shaker perfectly straight and even, from whence it is removed and bundled.

What I claim as my invention is—

The flexible concave A in combination with the thrashing-cylinder D, arranged and operating substantially in the manner and for the purpose herein shown and described.

LEWIS C. BICKINGS.

Witnesses:
ISAAC R. OAKFORD,
THOS. J. RORER.